(No Model.)
A. BURKHOLDER.
WRINGING MACHINE.
No. 529,592. Patented Nov. 20, 1894.
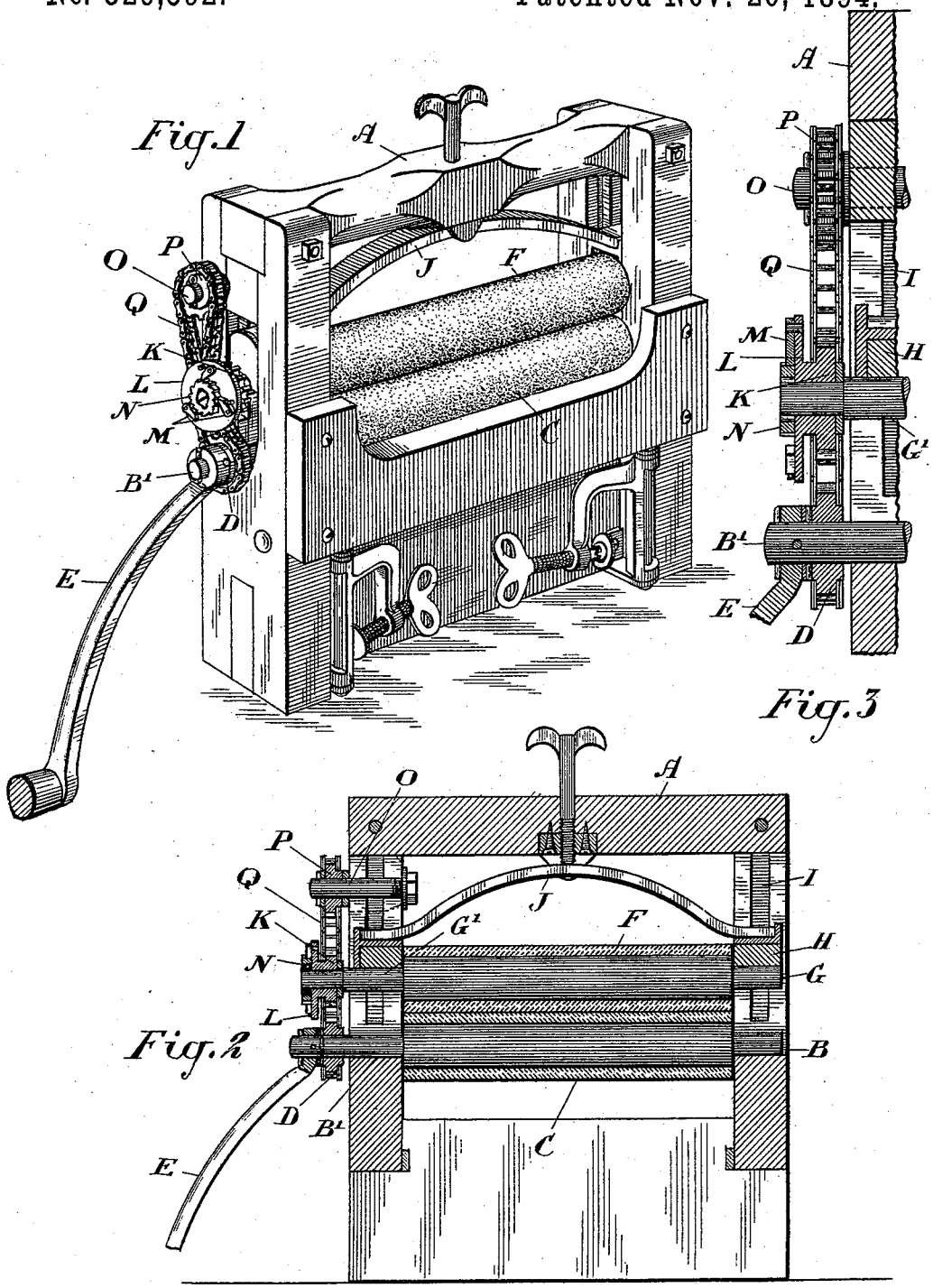
Witnesses
Inventor
Alfred Burkholder

UNITED STATES PATENT OFFICE.

ALFRED BURKHOLDER, OF TORONTO, CANADA.

WRINGING-MACHINE.

SPECIFICATION forming part of Letters Patent No. 529,592, dated November 20, 1894.

Application filed February 15, 1894. Serial No. 500,315. (No model.)

*To all whom it may concern:*

Be it known that I, ALFRED BURKHOLDER, gentleman, of the city of Toronto, in the county of York and Province of Ontario, Canada, have invented certain new and useful Improvements in Wringing-Machines; and I hereby declare that the following is a full, clear, and exact description of the same.

The object of this invention is to construct a cheaply manufactured and easily operated wringing machine, which consists essentially of the device hereinafter set forth, and more particularly pointed out in the claims.

In the drawings: Figure 1 is a perspective view of the wringing machine. Fig. 2 is a sectional view of the same. Fig. 3 is a sectional view of the driving gear.

Like letters of reference refer to like parts throughout the specification and drawings.

The framework A, of the wringing machine, may be of any of the ordinary constructions now in general use. Mounted in the framework A are the spindles B—B' of the roll C, covered with rubber or other suitable and similar material. It will be noticed that the spindle B' of the roll C projects beyond the side of the framework A, and that rigidly mounted upon the spindle B' on the outer side of the framework A is a sprocket wheel D, and that rigidly connected to the said spindle B' on the outer side of the sprocket wheel D is a crank E. Mounted on the top of the roll C is a roll F covered with rubber or similar substance. The spindles G—G' of the roll F are journaled respectively in blocks H sliding in guides I, formed in the sides of the framework A. Bearing upon the top of the sliding blocks H are the ends of a semi-elliptical spring J bearing downwardly the said blocks H, and pressing the roll F against the roll C. It will be noticed by reference to the drawings that the spindle G' of the roll F projects beyond the side of the frame A, and that loosely mounted upon the spindle G' on the outer sides of the frame work A is a sprocket or gear wheel K. Connected to the side face of the hub of the sprocket or gear wheel K is a metallic disk L, carrying three pivoted dogs M. Rigidly mounted on the spindle G' on the outer side of the disk L is a ratchet wheel N, with which mesh the dogs M pivotally connected to the disk L. Connected to the side of the framework A and above the roll F is a spindle O, upon which is loosely mounted a sprocket wheel P. Passing around the sprocket wheels D—P is a sprocket or drive chain Q, which also engages with the teeth of the sprocket wheel K, and causes the revolution of the said sprocket wheel K.

The operation of the machine is a dual one, and is as follows, viz: The roll C drives the roll F by means of friction during the free passage of the articles through the machine, and in the event of the passage of the articles through the machine becoming blocked the roll F is driven by means of the aforementioned gear. To be more complete in the description, we will assume, in the first place, that the articles are traveling freely through the machine. Motion is transmitted from the crank E to the roll C, and is transmitted from the roll C to the roll F by means of friction, and the transmission of this motion from the roll C to the roll F is continued as long as the articles are passing freely through the machine. It will be remembered that the sprocket wheel K is loosely mounted upon the spindle G', and it will be understood that while the sprocket chain Q is passing around the sprocket wheels D and P it is engaging with the teeth of the sprocket wheel K, loosely mounted upon the said spindle G', and it will also be remembered that while the said sprocket chain is engaging with the teeth of the sprocket wheel K it does not transmit any motion whatsoever to the roll F, until the passage of the articles between the said rolls C and F become blocked, when the roll F will be brought to a stop, and the sprocket chain Q continuing its travel will cause the continued revolution of the sprocket wheel K, and compel the dogs to revolve the ratchet wheel N and spindle G' and the roll F. It is well known that the most easily operated wringing machine is that in which one of the rolls is driven by friction from the other roll, but owing to the tendency of the articles in their passage through the machine becoming blocked, a machine driven in this manner has not been found to be entirely satisfactory. It is also well known that in those machines where one roll is driven by means of a gear meshing with the gear on the other roll, the machine is harder to operate in comparison with a machine that is driven by friction; and it is the object of this invention to so construct the present machine that it can be operated as easily as those machines where the rolls are driven by friction and at the same time to have all the advantages of the machine driven by gear.

What I claim, and desire to secure by Letters Patent, is—

1. In a wringing machine the combination of a framework a roll C journaled in the framework, means for transmitting motion to this roll, a sprocket wheel mounted upon the roll C, a roll F driven normally by friction from the roll C, a sprocket wheel mounted on the roll F, a spindle connected to the framework, a sprocket wheel loosely mounted on said spindle, a drive chain passing around the sprocket wheels on the roll C and said spindle meshing continuously with the sprocket wheel on the roll F, and means for driving the roll F in the event of the stoppage of the frictional revolution of the said roll, substantially as specified.

2. In a wringing machine the combination of the framework, a roll C journaled in the framework, a sprocket wheel mounted on the spindle of the roll C, means for transmitting a rotary motion to the roll C, a roll F mounted on the top of the roll C, a sprocket wheel K loosely mounted on the spindle G' of the roll F, dogs M pivotally connected to the side face of the sprocket wheel K, a ratchet wheel N rigidly mounted upon the spindle G', a sprocket wheel P mounted upon a spindle O connected to the framework, a sprocket chain Q passing around the sprocket wheels D and P, and engaging with the teeth of the sprocket wheel K, substantially as specified.

3. In a wringing machine the combination of the framework, a roll C journaled in the framework, a sprocket wheel D mounted on the spindle B' of the roll C, a roll F mounted on the top of the roll C, a sprocket wheel K loosely mounted on the spindle G' of the roll F, a disk L rigidly connected to the side face of the sprocket wheel K, dogs M pivotally connected to the side face of the disk L, a ratchet wheel N rigidly mounted on the spindle G', a spindle O connected to the framework A, a sprocket wheel P loosely mounted on the spindle O, a sprocket chain Q passing around the sprocket wheels D and P and engaging with the teeth of the sprocket wheel K, the roll F driven by friction from the roll C during the free passage of the articles between the said rolls, and driven by the sprocket chain Q engaging with the teeth of the sprocket wheel K during the stoppage of the roll F by the articles becoming blocked, substantially as specified.

Toronto, January 20, 1894.

ALFRED BURKHOLDER.

In presence of—
J. E. CAMERON,
DONALD C. RIDOUT.